(12) United States Patent
Geng et al.

(10) Patent No.: US 12,262,274 B2
(45) Date of Patent: Mar. 25, 2025

(54) COMMUNICATION METHOD, TERMINAL DEVICE, AND COMPUTER-READABLE STORAGE MEDIUM

(71) Applicant: HUAWEI TECHNOLOGIES CO., LTD., Guangdong (CN)

(72) Inventors: Tingting Geng, Shanghai (CN); Le Yan, Shenzhen (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 615 days.

(21) Appl. No.: 17/581,291

(22) Filed: Jan. 21, 2022

(65) Prior Publication Data

US 2022/0150789 A1 May 12, 2022

Related U.S. Application Data

(63) Continuation of application No. PCT/CN2020/103804, filed on Jul. 23, 2020.

(30) Foreign Application Priority Data

Jul. 23, 2019 (CN) .......................... 201910673876.5

(51) Int. Cl.
*H04W 4/00* (2018.01)
*H04W 36/00* (2009.01)
(Continued)

(52) U.S. Cl.
CPC ..... *H04W 36/305* (2018.08); *H04W 36/0058* (2018.08); *H04W 36/00837* (2018.08); *H04W 36/08* (2013.01); *H04W 36/0069* (2018.08)

(58) Field of Classification Search
CPC .......... H04W 36/305; H04W 36/0058; H04W 36/00837; H04W 36/08; H04W 36/0069;
(Continued)

(56) References Cited

U.S. PATENT DOCUMENTS 9,706,429 B2 * 7/2017 Ma ........................ H04W 28/18
10,306,695 B2 * 5/2019 Vajapeyam ........... H04W 76/18
(Continued)

FOREIGN PATENT DOCUMENTS

CN 101730164 A 6/2010
CN 104219787 A 12/2014
(Continued)

OTHER PUBLICATIONS

Extended European Search Report issued in European Application No. 20844491.9 on Aug. 3, 2022, 9 pages.
(Continued)

*Primary Examiner* — Amancio Gonzalez
(74) *Attorney, Agent, or Firm* — Fish & Richardson P.C.

(57) ABSTRACT

Example communication methods and apparatus are described. One example method includes determining, by a terminal device, that a connection failure occurs between the terminal device and a first cell, where the first cell is a cell of a first network device. The terminal device determines signal quality of a second cell of a second network device, where both the first network device and the second network device provide communication services for the terminal device. If the signal quality of the second cell is greater than or equal to a first preset threshold, the terminal device performs a connection recovery process between the terminal device and the first cell by using the second cell.

20 Claims, 7 Drawing Sheets

(51) Int. Cl.
   *H04W 36/08*     (2009.01)
   *H04W 36/30*     (2009.01)

(58) Field of Classification Search
   CPC ..... H04W 76/15; H04W 76/19; H04W 24/04;
                    H04W 24/08; H04W 76/18
   USPC .......................................................... 370/331
   See application file for complete search history.

(56) References Cited

U.S. PATENT DOCUMENTS

| | | | | |
|---|---|---|---|---|
| 10,750,564 | B2* | 8/2020 | Zhou | H04W 72/23 |
| 10,959,279 | B2* | 3/2021 | Orsino | H04W 76/38 |
| 11,122,472 | B2* | 9/2021 | Da Silva | H04W 72/046 |
| 11,211,990 | B2* | 12/2021 | Yi | H04L 5/0053 |
| 11,228,990 | B2* | 1/2022 | Jeon | H04W 52/50 |
| 11,252,620 | B2* | 2/2022 | Fan | H04W 74/0833 |
| 11,412,425 | B2* | 8/2022 | Da Silva | H04W 36/0072 |
| 11,477,836 | B2* | 10/2022 | Hong | H04W 36/033 |
| 11,665,567 | B2* | 5/2023 | Wang | H04B 7/0626 370/242 |
| 11,678,235 | B2* | 6/2023 | Cirik | H04B 7/0695 370/216 |
| 11,723,103 | B2* | 8/2023 | Zhou | H04B 7/06966 375/267 |
| 11,844,131 | B2* | 12/2023 | Park | H04W 76/18 |
| 11,949,552 | B2* | 4/2024 | Cirik | H04B 7/0695 |
| 12,022,431 | B2* | 6/2024 | Park | H04W 68/02 |
| 12,069,759 | B2* | 8/2024 | Jung | H04L 1/1812 |
| 12,088,387 | B2* | 9/2024 | Wang | H04W 16/28 |
| 2015/0334767 | A1* | 11/2015 | Chien | H04W 36/08 370/217 |
| 2019/0089579 | A1* | 3/2019 | Sang | H04W 40/36 |
| 2021/0021320 | A1* | 1/2021 | Koskela | H04B 7/0695 |
| 2022/0110181 | A1* | 4/2022 | Miao | H04L 1/1822 |
| 2022/0353775 | A1* | 11/2022 | Wager | H04W 76/19 |
| 2022/0417772 | A1* | 12/2022 | Xia | H04W 24/04 |
| 2023/0421231 | A1* | 12/2023 | Miao | H04B 7/088 |

FOREIGN PATENT DOCUMENTS

| | | |
|---|---|---|
| CN | 104349361 A | 2/2015 |
| CN | 104955163 A | 9/2015 |
| CN | 108024288 A | 5/2018 |
| CN | 109842915 A | 6/2019 |
| EP | 3537761 B1 | 6/2021 |
| WO | 2017196126 A1 | 11/2017 |
| WO | 2018170885 A1 | 9/2018 |

OTHER PUBLICATIONS

Kyocera, "Initial consideration of fast MCG link recovery," 3GPP TSG-RAN WG2 #105, R2-1900917, Athens, Greece, Feb. 25-Mar. 1, 2019, 3 pages.

Office Action issued in Chinese Application No. 201910673876.5 on Sep. 1, 2021, 11 pages (with English translation).

Office Action issued in Chinese Application No. 201910673876.5 on Jan. 19, 2022, 6 pages.

PCT International Search Report and Written Opinion issued in International Application No. PCT/CN2020/103804 on Oct. 12, 2020, 15 pages (with English translation).

* cited by examiner

COMMUNICATION METHOD, TERMINAL DEVICE, AND COMPUTER-READABLE STORAGE MEDIUM

CROSS-REFERENCE TO RELATED APPLICATIONS

This application is a continuation of International Application No. PCT/CN2020/103804, filed on Jul. 23, 2020, which claims priority to Chinese Patent Application No. 201910673876.5, filed on Jul. 23, 2019. The disclosures of the aforementioned applications are hereby incorporated by reference in their entireties.

TECHNICAL FIELD

The present invention relates to the field of communication technologies, and in particular, to a communication method, a terminal device, and a computer-readable storage medium.

BACKGROUND

In a dual connectivity (DC) scenario, user equipment (UE) is generally connected to two serving base stations, where one serving base station is a master eNodeB, and the other serving base station is a secondary eNodeB. If a connection failure occurs on the secondary eNodeB, the UE remains in a connected state, and the UE may report connection failure information of the secondary eNodeB through the master eNodeB. If a connection failure occurs on the master eNodeB, the UE can only trigger a reestablishment procedure. The UE cannot perform service transmission in a period from time at which the UE detects the connection failure on the master eNodeB to time at which the UE completes the reestablishment procedure.

In third generation partnership project (3GPP) Release 16 (R16), a new solution is proposed for a case in which the connection failure occurs on the master eNodeB. That is, if the connection failure occurs on the master eNodeB, a terminal device may not trigger the reestablishment procedure. Instead, a recovery process of the master eNodeB is performed by using the secondary eNodeB.

However, data interruption duration of the terminal may be prolonged due to introduction of the recovery process of the master eNodeB.

SUMMARY

Embodiments of this application provide a communication method, a terminal device, and a computer-readable storage medium, to reduce data interruption duration of a terminal device when a connection failure occurs on a master eNodeB of the terminal device.

According to a first aspect, an embodiment of this application provides a communication method, applied to a terminal device. The method includes: determining, by the terminal device, that a connection failure occurs between the terminal device and a first cell, where the first cell is a cell of a first network device; determining, by the terminal device, signal quality of a second cell of a second network device, where both the first network device and the second network device provide communication services for the terminal device; and if the signal quality of the second cell is greater than or equal to a first preset threshold, performing, by the terminal device, a connection recovery process between the terminal device and the first cell by using the second cell. According to this embodiment of this application, when the terminal device detects that a connection failure occurs on a master cell group (MCG), the terminal device chooses, based on measurement quality of a secondary cell group (SCG), whether to perform an MCG fast recovery process, to avoid a case in which service interruption duration of UE is increased in a scenario in which a handover parameter configuration is inappropriate when the terminal device directly performs the MCG fast recovery process after the connection failure occurs on the MCG. In this embodiment of this application, a most appropriate recovery mechanism may be selected, thereby reducing data interruption duration of the terminal device.

In a possible design, the method further includes: performing, by the terminal device, cell selection if the signal quality of the second cell is less than the first preset threshold. According to this embodiment of this application, when the terminal device detects that the connection failure occurs on the MCG, the terminal device chooses, based on the measurement quality of the SCG, to perform the MCG fast recovery process or a cell selection process, to select the most appropriate recovery mechanism. The most appropriate recovery mechanism may be selected, thereby reducing the data interruption duration of the terminal device.

In a possible design, if a cell selected by the terminal device after the cell selection is a third cell of the second network device, the method further includes: performing, by the terminal device, the connection recovery process between the terminal device and the first cell by using the third cell. According to this embodiment of this application, the MCG fast recovery process is continued by using the third cell in an original SCG, thereby reducing the data interruption duration of the terminal device.

In a possible design, if a cell selected by the terminal device after the cell selection is a fourth cell of a third network device, the method further includes: sending, by the terminal device, a reestablishment request to the third network device to which the fourth cell belongs.

In a possible design, the determining, by the terminal device, that a connection failure occurs between the terminal device and a first cell includes: determining, by the terminal device, that a moment at which the connection failure occurs between the terminal device and the first cell is a first moment; and the determining, by the terminal device, signal quality of a second cell of a second network device includes: if duration between a moment at which the terminal device is successfully handed over to the first network device and the first moment is greater than or equal to a second preset threshold, determining, by the terminal device, the signal quality of the second cell of the second network device.

In a possible design, before the determining, by the terminal device, that a connection failure occurs between the terminal device and a first cell, the method further includes:

receiving, by the terminal device, a first message sent by a fourth network device, where the first message is used to indicate the terminal device to hand over from the fourth network device to the first network device and the second network device; and handing over, by the terminal device, from the fourth network device to the first network device and the second network device based on the first message.

According to a second aspect, an embodiment of this application provides a communication method, applied to a terminal device. The method includes: determining, by the terminal device, that a connection failure occurs between the terminal device and a first cell, where the first cell is a cell of a first network device; determining, by the terminal device, signal quality of a second cell of a second network device, where both the first network device and the second network device provide communication services for the terminal device; and performing, by the terminal device, cell selection if the signal quality of the second cell is less than a first preset threshold. According to this embodiment of this application, when the terminal device detects that a connection failure occurs on an MCG, the terminal device selects, based on measurement quality of an SCG, whether to perform the cell selection. In this embodiment of this application, a most appropriate recovery mechanism may be selected, thereby reducing data interruption duration of the terminal device.

In a possible design, if a cell selected by the terminal device after the cell selection is a third cell of the second network device, the method further includes: performing, by the terminal device, the connection recovery process between the terminal device and the first cell by using the third cell. According to this embodiment of this application, an MCG fast recovery process is continued by using the third cell in an original SCG, thereby reducing the data interruption duration of the terminal device.

In a possible design, if a cell selected by the terminal device after the cell selection is a fourth cell of a third network device, the method further includes: sending, by the terminal device, a reestablishment request to the third network device to which the fourth cell belongs.

In a possible design, the determining, by the terminal device, that a connection failure occurs between the terminal device and a first cell includes: determining, by the terminal device, that a moment at which the connection failure occurs between the terminal device and the first cell is a first moment; and the determining, by the terminal device, signal quality of a second cell of a second network device is specifically: if duration between a moment at which the terminal device is successfully handed over to the first network device and the first moment is less than a second preset threshold, determining, by the terminal device, the signal quality of the second cell of the second network device.

In a possible design, the determining, by the terminal device, that a connection failure occurs between the terminal device and a first cell includes: determining, by the terminal device, that a moment at which the connection failure occurs between the terminal device and the first cell is a first moment; and the determining, by the terminal device, signal quality of a second cell of a second network device is specifically: if the terminal device is not successfully handed over to the first network device at the first moment, determining, by the terminal device, the signal quality of the second cell of the second network device.

In a possible design, before the determining, by the terminal device, that a connection failure occurs between the terminal device and a first cell, the method further includes:
  receiving, by the terminal device, a first message sent by a fourth network device, where the first message is used to indicate the terminal device to hand over from the fourth network device to the first network device and the second network device; and
  handing over, by the terminal device, from the fourth network device to the first network device and the second network device based on the first message.

According to a third aspect, an embodiment of the present invention provides a terminal device. The terminal device may alternatively be an apparatus in the terminal device, or an apparatus that can be used together with the terminal device. In a design, the terminal device may include modules that are in a one-to-one correspondence with the methods/operations/steps/actions described in the first aspect. The modules may be implemented by a hardware circuit, software, or a combination of a hardware circuit and software. In a design, the terminal device may include a first determining unit, a second determining unit, and a first recovery unit. For example,
  the first determining unit is configured to determine that a connection failure occurs between the terminal device and a first cell, where the first cell is a cell of a first network device;
  the second determining unit is configured to determine signal quality of a second cell of a second network device, where both the first network device and the second network device provide communication services for the terminal device; and
  the first recovery unit is configured to: if the signal quality of the second cell is greater than or equal to a first preset threshold, perform a connection recovery process between the terminal device and the first cell by using the second cell.

In a possible design, the terminal device further includes:
  a selection unit, configured to perform cell selection if the signal quality of the second cell is less than the first preset threshold.

In a possible design, if a cell selected by the terminal device after the cell selection is a third cell of the second network device, the terminal device further includes:
  a second recovery unit, configured to perform the connection recovery process between the terminal device and the first cell by using the third cell.

In a possible design, if a cell selected by the terminal device after the cell selection is a fourth cell of a third network device, the terminal device further includes:
  a sending unit, configured to send a reestablishment request to the third network device to which the fourth cell belongs.

In a possible design, the first determining unit is specifically configured to determine that a moment at which the connection failure occurs between the terminal device and the first cell is a first moment; and
  the second determining unit is specifically configured to: if duration between a moment at which the terminal device is successfully handed over to the first network device and the first moment is greater than or equal to a second preset threshold, determine the signal quality of the second cell of the second network device.

According to a fourth aspect, an embodiment of the present invention provides a terminal device. The terminal device may alternatively be an apparatus in the terminal device, or an apparatus that can be used together with the terminal device. In a design, the terminal device may include modules that are in a one-to-one correspondence with the methods/operations/steps/actions described in the second aspect. The modules may be implemented by a hardware circuit, software, or a combination of a hardware circuit and software. In a design, the terminal device may include a first determining unit, a second determining unit, and a selection unit. For example,
  the first determining unit is configured to determine that a connection failure occurs between the terminal device and a first cell, where the first cell is a cell of a first network device;
  the second determining unit is configured to determine signal quality of a second cell of a second network device, where both the first network device and the second network device provide communication services for the terminal device; and the selection unit is configured to perform cell selection if the signal quality of the second cell is less than a first preset threshold.

In a possible design, if a cell selected by the terminal device after the cell selection is a third cell of the second network device, the terminal device further includes:

a recovery unit, configured to perform the connection recovery process between the terminal device and the first cell by using the third cell.

In a possible design, if a cell selected by the terminal device after the cell selection is a fourth cell of a third network device, the terminal device further includes:

a sending unit, configured to send a reestablishment request to the third network device to which the fourth cell belongs.

In a possible design, the first determining unit is specifically configured to determine that a moment at which the connection failure occurs between the terminal device and the first cell is a first moment; and the second determining unit is specifically configured to:
if duration between a moment at which the terminal device is successfully handed over to the first network device and the first moment is less than a second preset threshold, determine the signal quality of the second cell of the second network device.

In a possible design, the first determining unit is specifically configured to determine that a moment at which the connection failure occurs between the terminal device and the first cell is a first moment; and the second determining unit is specifically configured to:
if the terminal device is not successfully handed over to the first network device at the first moment, determine the signal quality of the second cell of the second network device.

According to a fifth aspect, an embodiment of the present invention provides a terminal device. The terminal device includes a processor, configured to implement the method described in the first aspect. The terminal device may further include a memory, configured to store program instructions and data. The memory is coupled with or integrated into the processor. When executing the instructions stored in the memory, the processor can implement the method described in the first aspect. The terminal device may further include a communication interface. The communication interface is used by the terminal device to communicate with another device. For example, the communication interface may be a transceiver, a circuit, a bus, a module, or another type of communication interface, and the another device may be a network device. In a possible design, the terminal device includes:

the memory, configured to store program instructions; and
the processor, configured to determine that a connection failure occurs between the terminal device and a first cell, where the first cell is a cell of a first network device, where the processor is further configured to determine signal quality of a second cell of a second network device, where both the first network device and the second network device provide communication services for the terminal device; and the processor is further configured to: if the signal quality of the second cell is greater than or equal to a first preset threshold, perform a connection recovery process between the terminal device and the first cell by using the second cell.

In a possible design, the processor is further configured to perform cell selection if the signal quality of the second cell is less than the first preset threshold.

In a possible design, if a cell selected by the processor after the cell selection is a third cell of the second network device, the processor is further configured to perform the connection recovery process between the terminal device and the first cell by using the third cell.

In a possible design, if a cell selected by the processor after the cell selection is a fourth cell of a third network device, the processor is further configured to send, through the communication interface, a reestablishment request to the third network device to which the fourth cell belongs.

In a possible design, that the processor is configured to determine that a connection failure occurs between the terminal device and a first cell includes:

the processor is configured to determine that a moment at which the connection failure occurs between the terminal device and the first cell is a first moment; and that the processor is configured to determine signal quality of a second cell of a second network device includes:

the processor is configured to: if duration between a moment at which the terminal device is successfully handed over to the first network device and the first moment is greater than or equal to a second preset threshold, determine the signal quality of the second cell of the second network device.

According to a sixth aspect, an embodiment of the present invention provides a terminal device. The terminal device includes a processor, configured to implement the method described in the second aspect. The terminal device may further include a memory, configured to store program instructions and data. The memory is coupled with or integrated into the processor. When executing the instructions stored in the memory, the processor can implement the method described in the second aspect. The terminal device may further include a communication interface. The communication interface is used by the terminal device to communicate with another device. For example, the communication interface may be a transceiver, a circuit, a bus, a module, or another type of communication interface, and the another device may be a network device. In a possible design, the terminal device includes:

the memory, configured to store program instructions; and
the processor, configured to determine that a connection failure occurs between the terminal device and a first cell, where the first cell is a cell of a first network device, where the processor is further configured to determine signal quality of a second cell of a second network device, where both the first network device and the second network device provide communication services for the terminal device; and the processor is further configured to perform cell selection if the signal quality of the second cell is less than a first preset threshold.

In a possible design, if a cell selected by the processor after the cell selection is a third cell of the second network device, the processor is further configured to:

perform, by the terminal device, the connection recovery process between the terminal device and the first cell by using the third cell.

In a possible design, if a cell selected by the processor after the cell selection is a fourth cell of a third network device, the processor is further configured to send, through the communication interface, a reestablishment request to the third network device to which the fourth cell belongs.

In a possible design, that the processor is configured to determine that a connection failure occurs between the terminal device and a first cell includes: the processor is configured to determine that a moment at which the connection failure occurs between the terminal device and the first cell is a first moment; and that the processor is further configured to determine signal quality of a second cell of a second network device is specifically:

the processor is further configured to: if duration between a moment at which the terminal device is successfully handed over to the first network device and the first moment is less than a second preset threshold, determine the signal quality of the second cell of the second network device.

In a possible design, that the processor is configured to determine that a connection failure occurs between the terminal device and a first cell includes:

the processor is configured to determine that a moment at which the connection failure occurs between the terminal device and the first cell is a first moment; and that the processor is further configured to determine signal quality of a second cell of a second network device is specifically:

the processor is further configured to: if the terminal device is not successfully handed over to the first network device at the first moment, determine the signal quality of the second cell of the second network device.

According to a seventh aspect, an embodiment of the present invention further provides a computer-readable storage medium, including instructions. When the instructions are run on a computer, the computer is enabled to perform the method described in the first aspect.

According to an eighth aspect, an embodiment of the present invention further provides a computer-readable storage medium, including instructions. When the instructions are run on a computer, the computer is enabled to perform the method described in the second aspect.

According to a ninth aspect, an embodiment of the present invention provides a computer program product, including instructions. When the computer program product runs on a computer, the computer is enabled to perform the method described in the first aspect.

According to a tenth aspect, an embodiment of the present invention provides a computer program product, including instructions. When the computer program product runs on a computer, the computer is enabled to perform the method described in the second aspect.

According to an eleventh aspect, an embodiment of the present invention provides a chip system. The chip system includes a processor, may further include a memory, and is configured to implement functions of the terminal device in the foregoing method. The chip system may include a chip, or may include a chip and another discrete device.

BRIEF DESCRIPTION OF DRAWINGS

To describe technical solutions in embodiments of this application or in the background more clearly, the following describes the accompanying drawings for describing the embodiments of this application or the background.

DESCRIPTION OF EMBODIMENTS

Terms used in the embodiments of this application are merely used to explain specific embodiments of this application, but are not intended to limit this application.

Figure 1:
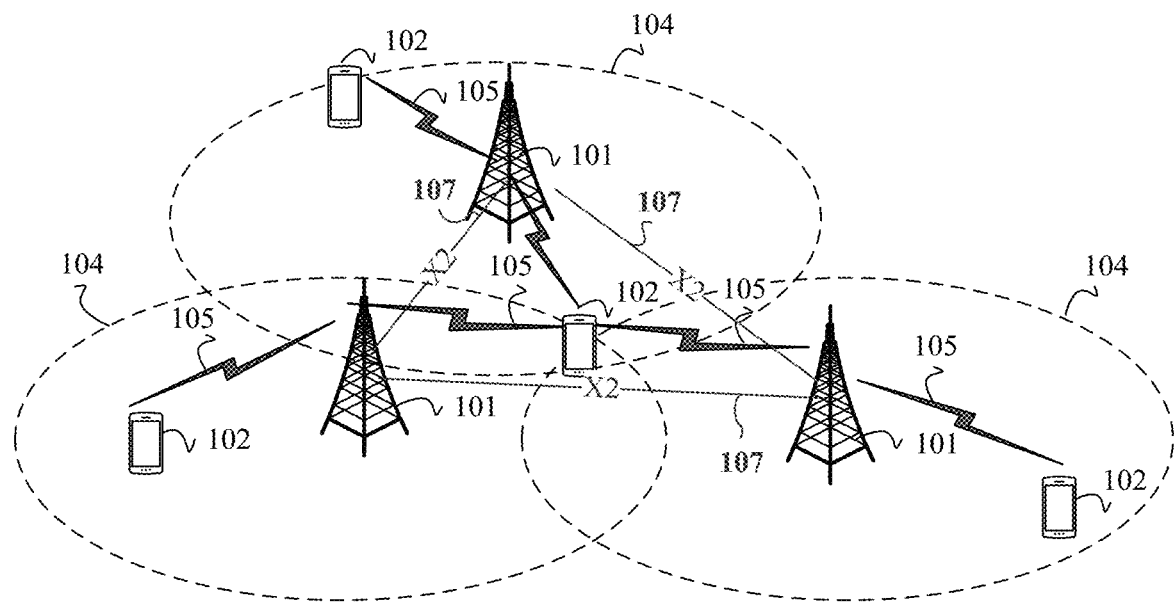
FIG. 1 is a schematic architectural diagram of a wireless communication system according to an embodiment of this application.

FIG. 1 shows a wireless communication system 100 according to an embodiment of this application. The wireless communication system 100 includes a communication device, and the communication device may perform wireless communication by using an air interface resource. The communication device may include a network device 101 and a terminal device 102, and the network device 101 may also be referred to as a network side device. The air interface resource may include at least one of a time domain resource, a frequency domain resource, a code resource, and a space resource.

The network device 101 may perform wireless communication with the terminal device 102 by using one or more antennas. Each network device 101 may provide communication coverage for a coverage area 104 corresponding to each network device 101. The coverage area 104 corresponding to the network device 101 may be divided into a plurality of sectors. One sector corresponds to a part of the coverage area (not shown). The network device 101 may communicate with the terminal device 102 through a radio air interface 105. Alternatively, network devices 101 may directly or indirectly communicate with each other through an interface 107 (for example, an X2/Xn interface).

The terminal device 102 in the embodiments of this application may also be referred to as a terminal, and may be a device having a wireless transceiver function. The terminal device 102 may be deployed on land, and includes an indoor device, an outdoor device, a handheld device, or a vehicle-mounted device. Alternatively, the terminal device 102 may be deployed on a water surface (for example, on a ship), or may be deployed in the air (for example, on an airplane, a balloon, or a satellite). The terminal device may be user equipment (UE), and the UE includes a handheld device, a vehicle-mounted device, a wearable device, or a computing device that has a wireless communication function. For example, the UE may be a machine type communication (MTC) terminal, a mobile phone, a tablet computer, or a computer that has a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus configured to implement a terminal function may be a terminal, or may be an apparatus, for example, a chip system, that can support the terminal in implementing the function. The apparatus may be mounted in the terminal. In the embodiments of this application, the chip system may include a chip, or may include a chip and another discrete component. In the technical solutions provided in the embodiments of this application, the technical solutions provided in the embodiments of this application are described by using an example in which the apparatus for implementing the terminal function is a terminal and the terminal is UE.

The network device in the embodiments of this application includes a base station (BS), and may be a device that is deployed in a radio access network and that can perform wireless communication with the terminal. The base station may be in a plurality of forms, such as a macro base station, a micro base station, a relay station, and an access point. For example, the base station in the embodiments of this application may be a base station in 5G or a base station in Long-Term Evolution (LTE). The base station in 5G may also be referred to as a transmission reception point (TRP) or a next-generation nodeB (gNB). In the embodiments of this application, an apparatus configured to implement a network device function may be a network device, or may be an apparatus, for example, a chip system, that can support the network device in implementing the function. The apparatus may be mounted in the network device. In the technical solutions provided in the embodiments of this application, the technical solutions provided in the embodiments of this application are described by using an example in which the apparatus for implementing the network device function is a network device and the network device is a base station.

In this application, the wireless communication system 100 is not limited to a long term evolution (LTE) system, and may alternatively be a future evolved 5G system, a New Radio (NR) system, a wireless fidelity (Wi-Fi) system, or the like. The wireless communication system 100 may alternatively be an internet of things (IoT) system, an MTC system, an mMTC system, an enhanced machine type communication (eMTC) system, or the like.

The technical solutions provided in the embodiments of this application may be applied to wireless communication between communication devices. The wireless communication between the communication devices may include wireless communication between the network device and the terminal, wireless communication between network devices, and wireless communication between terminals. In the embodiments of this application, the term "wireless communication" may be referred to as "communication" for short, and the term "communication" may also be described as "data transmission", "information transmission", or "transmission". The technical solutions may be used to perform wireless communication between a scheduling entity and a subordinate entity. A person skilled in the art may use the technical solutions provided in the embodiments of this application to perform wireless communication between another scheduling entity and the subordinate entity, for example, wireless communication between a macro base station and a micro base station, for example, wireless communication between a first terminal and a second terminal.

It should be noted that the terms "system" and "network" may be used interchangeably in the embodiments of this application. A signal may also be described as a sequence, data, or the like. "At least one" may also be described as "one or more", and "a plurality of" may be two, three, four, or more. This is not limited in this application. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "I" generally indicates an "or" relationship between the associated objects unless specified otherwise.

In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

Figure 2:
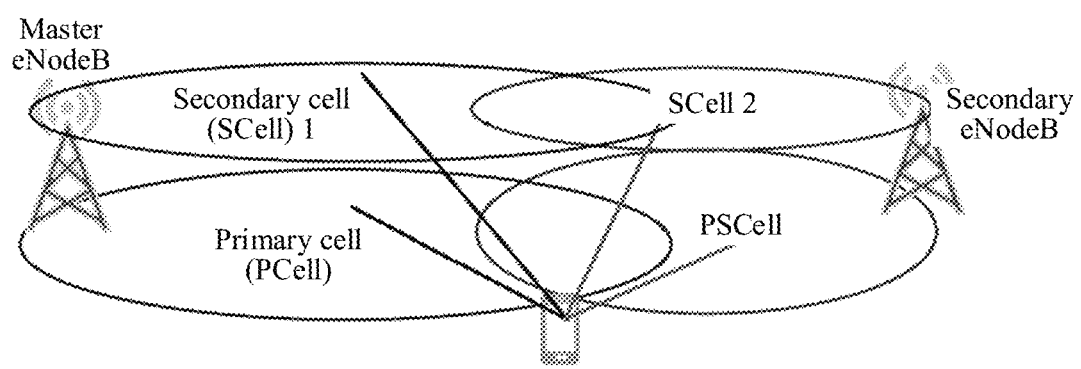
FIG. 2 is a schematic diagram showing that a terminal device is simultaneously connected to a master eNodeB and a secondary eNodeB according to an embodiment of this application.

In the embodiments of this application, multi-connectivity (MC) may be configured for the terminal device 102. In the embodiments of this application, an example in which dual connectivity (DC) is configured for the terminal device 102 and the network device is a base station is used for description. In DC mode, the terminal device 102 may be connected to two serving base stations, where one serving base station is a master eNodeB, and the other serving base station is a secondary eNodeB. Refer to FIG. 2. Serving cells of the terminal device 102 of the master eNodeB include a primary cell (PCell) and 0 to n (where n is a positive integer) secondary cells (SCells). A serving cell group of the terminal device 102 of the master eNodeB is referred to as a master cell group (MCG). Serving cells of the terminal device 102 of the secondary eNodeB include a primary secondary cell (PSCell) and 0 to n secondary cells SCells. A serving cell group of the terminal device 102 of the secondary eNodeB is referred to as a secondary cell group (SCG).

Figure 3:
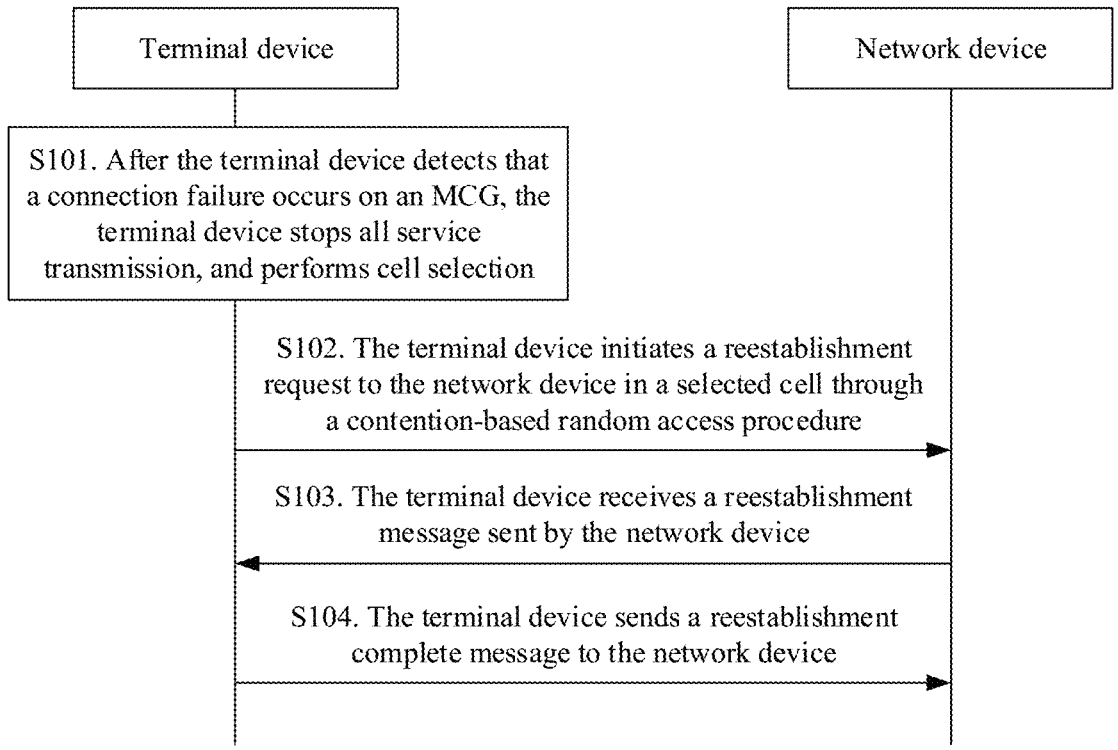
FIG. 3 is a schematic flowchart of a reestablishment process according to an embodiment of this application.

In the DC mode, the terminal device detects whether a connection failure occurs on a link between the terminal device and the MCG and whether a connection failure occurs on a link between the terminal device and the SCG. If the connection failure occurs on the SCG, the terminal device still remains in a connected state. In addition, the terminal device may report connection failure information of the SCG by using the MCG. NRR 15 (Release 15) is used as an example. It is proposed that when the terminal device detects that the connection failure occurs on the MCG, the terminal device can only trigger a reestablishment procedure. In the reestablishment process, the terminal device stops all services. Even if no connection failure occurs on the SCG, the terminal device stops service transmission between the terminal device and the SCG. Refer to FIG. 3. The reestablishment procedure may include: After the terminal device detects that the connection failure occurs on the MCG, the terminal device stops all service transmission, and performs cell selection (step S101), where a cell after the cell selection may be any cell. The terminal device initiates a reestablishment request to the network device in the selected cell through a contention-based random access procedure (step S102). The terminal device receives a reestablishment message sent by the network device (step S103).

The terminal device sends a reestablishment complete message to the network device (step S104). In this case, reestablishment succeeds. The terminal device can perform service transmission only after entering the connected state. Therefore, in a period from time at which the terminal device detects that the connection failure occurs on the MCG to time at which the terminal device completes the reestablishment procedure, the terminal device cannot perform the service transmission.

In R16, it is proposed that the UE does not trigger the reestablishment procedure if the connection failure occurs on the MCG. In a DC architecture, the terminal device detects whether a connection failure occurs on the links of the MCG and the SCG. If the connection failure occurs on the link between the terminal device and the MCG, the terminal device may not trigger the reestablishment procedure, but performs MCG recovery. An MCG recovery process may also be referred to as an MCG recovery mechanism, and MCG recovery may also be referred to as MCG fast recovery.

In an example, the MCG recovery mechanism means that if the connection failure occurs on the link between the terminal device and the MCG, the terminal device may report connection failure information of the MCG by using the SCG, and attempt to recover a connection between the terminal device and the MCG. It may be understood that the foregoing recovery mechanism may also be referred to as a connection recovery process or a fast recovery process.

Figure 4:
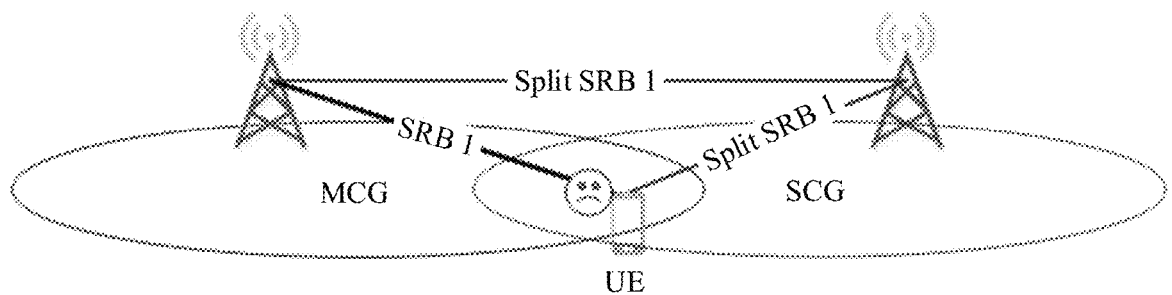
FIG. 4 is a schematic diagram of an MCG recovery process according to an embodiment of this application.

In an example of the MCG recovery, the terminal device may indicate the connection failure information of the MCG to the SCG through an SCG split signaling radio bearer (SRB) 1 or an SRB 3 or a new SCG SRB. The SCG may forward the connection failure information of the MCG to the MCG, so that the MCG determines, based on the connection failure information of the MCG, that the connection failure occurs on the link between the terminal device and the MCG, to perform the MCG fast recovery. In FIG. 4, an example in which the MCG fast recovery is performed through the split SRB 1 is used. When the connection failure occurs on the MCG, the terminal device sends the connection failure information of the MCG to the master eNodeB through the split SRB 1 on the secondary eNodeB to which the SCG belongs. The secondary eNodeB sends the connection failure information of the MCG to the master eNodeB to which the MCG of the terminal device belongs, to notify that the connection failure occurs between the MCG and the terminal device.

In the embodiments of this application, that "the connection failure occurs on the link between the terminal device and the MCG" may also be referred to as that "the connection failure occurs on the MCG", and that "the connection failure occurs on the link between the terminal device and the SCG" may also be referred to as that "the connection failure occurs on the SCG". However, the embodiments of this application are not limited thereto. In an example, that the connection failure occurs on the MCG in the embodiments of this application may mean that a connection failure occurs on a link between the terminal device and the primary cell in the MCG or a special cell (SpCell) in the MCG. Alternatively, that the connection failure occurs on the MCG may mean that a connection failure occurs on all links between the terminal device and all cells in the MCG.

Similarly, that the connection failure occurs on the SCG in the embodiments of this application may mean that a connection failure occurs on a link between the terminal device and the primary secondary cell in the SCG or a special cell (SpCell) in the SCG. Alternatively, that the connection failure occurs between the terminal device and the SCG may mean that a connection failure occurs on all links between the terminal device and all cells in the SCG.

In the embodiments of this application, a cause of the connection failure may include at least one of the following: a handover failure (HOF), a radio link failure (RLF), a reconfiguration synchronization failure, a failure of handover from new radio (NR) to another system, an integrity check failure, a radio resource control (RRC) connection reconfiguration failure, or the like. This is not limited in the embodiments of this application.

In the embodiments of this application, an MCG connection failure scenario includes at least one of the following: an MCG RLF, an RRC reconfiguration failure caused by a failure of the UE to apply an RRC reconfiguration message configured by the MCG, an integrity protection failure, a failure of the UE to complete configuration after receiving a handover command, a handover failure of the UE from NR to LTE, or the like.

The RLF also includes a handover scenario, for example, an RLF caused by an inappropriate handover parameter configuration used by the network device for handover decision. A handover parameter includes at least one of a quality threshold, hysteresis time, trigger time, a threshold deviation, and the like. The inappropriate handover parameter configuration may trigger too late handover (too late HO), too early handover (too early HO), and handover to a wrong cell (HO to wrong cell). The too late HO means that a connection failure occurs after the terminal device is connected to a current serving cell for a period of time, and the terminal device attempts to reestablish a connection in another cell. For example, before the connection failure occurs, the terminal device remains in the connected state in the current serving cell. Quality of the current serving cell deteriorates, but the terminal device receives no handover command. Therefore, the terminal device detects the connection failure in the current serving cell, and then the terminal device attempts to reestablish the connection in another cell.

It should be noted that, in the embodiments of this application, "a period of time" may be a relatively long period of time, namely, a relatively long time segment. A specific length of "the period of time" is not limited in the embodiments. For example, a value of the period of time may be greater than 1 s. That is, the connection failure occurs after the terminal device is connected to the current serving cell for at least 1 s.

The too early HO means that a connection failure occurs soon after the terminal device is successfully handed over from a source cell to a target cell, or a connection failure occurs in a process of handing over from a source cell to a target cell, and the terminal device attempts to reestablish a connection in the source cell. For example, the terminal device receives a handover command in the source cell, the connection failure occurs soon after the handover to the target cell, or a handover failure occurs in the handover process, and the terminal device attempts to reestablish the connection in the source cell.

It should be noted that, in the embodiments of this application, the term "soon" may be understood as a relatively short time segment. A specific length of the time segment is not limited in the embodiments. For example, a value of the time segment corresponding to the term "soon" may be less than 10 ms. That is, the connection failure occurs within 10 ms after the terminal device is successfully handed over from the source cell to the target cell.

The HO to wrong cell means that a connection failure occurs soon after the terminal device is successfully handed over from a source cell to a target cell, or a connection failure occurs in a process of handing over from a source cell to a target cell, and the terminal device attempts to reestablish a connection in another cell (where the another cell is a cell different from the source cell and the target cell). For example, the terminal device receives a handover command in the source cell, the connection failure occurs soon after the handover to the target cell, or the handover failure occurs in the handover process, and the terminal device attempts to reestablish the connection in the another cell.

In the foregoing handover scenario, because the MCG fast recovery process is introduced, data interruption duration may be prolonged. The following separately describes the foregoing three handover cases.

In the case of the too late HO, if the UE establishes a connection to only one network device, the UE immediately performs a reestablishment procedure when detecting that the connection failure occurs between the UE and the serving cell. When an original configuration of the UE is DC, the UE detects that the connection failure occurs on the link between the UE and the MCG, in the MCG fast recovery mechanism, the UE first attempts to perform MCG recovery by using the SCG. However, the link of the SCG may be poorer, causing an MCG recovery failure. After the failure, the UE performs the reestablishment procedure. Consequently, the reestablishment procedure of the UE may be delayed, that is, the data interruption duration of the UE is prolonged.

In the case of the too early HO and the HO to wrong cell, when a target handover configuration configured by an original serving network device of the UE for the UE is DC, and in a handover process, the UE detects that a connection failure occurs on a link between the UE and a target MCG, with reference to the MCG fast recovery mechanism, the UE attempts to perform MCG recovery by using a new SCG. Consequently, a problem that the data interruption duration of the UE is prolonged due to the MCG recovery failure that is caused by poor signal quality of the new SCG also exists.

For the foregoing cases, if the UE performs the MCG fast recovery process when the connection failure occurs on the MCG, service interruption duration of the UE is prolonged in a scenario in which the handover parameter configuration is inappropriate. Therefore, when the connection failure occurs on the master eNodeB in a DC scenario, how to reduce the data interruption duration of the UE to recover a service of the UE as soon as possible is a technical problem that needs to be resolved in the embodiments of this application.

Figure 5:
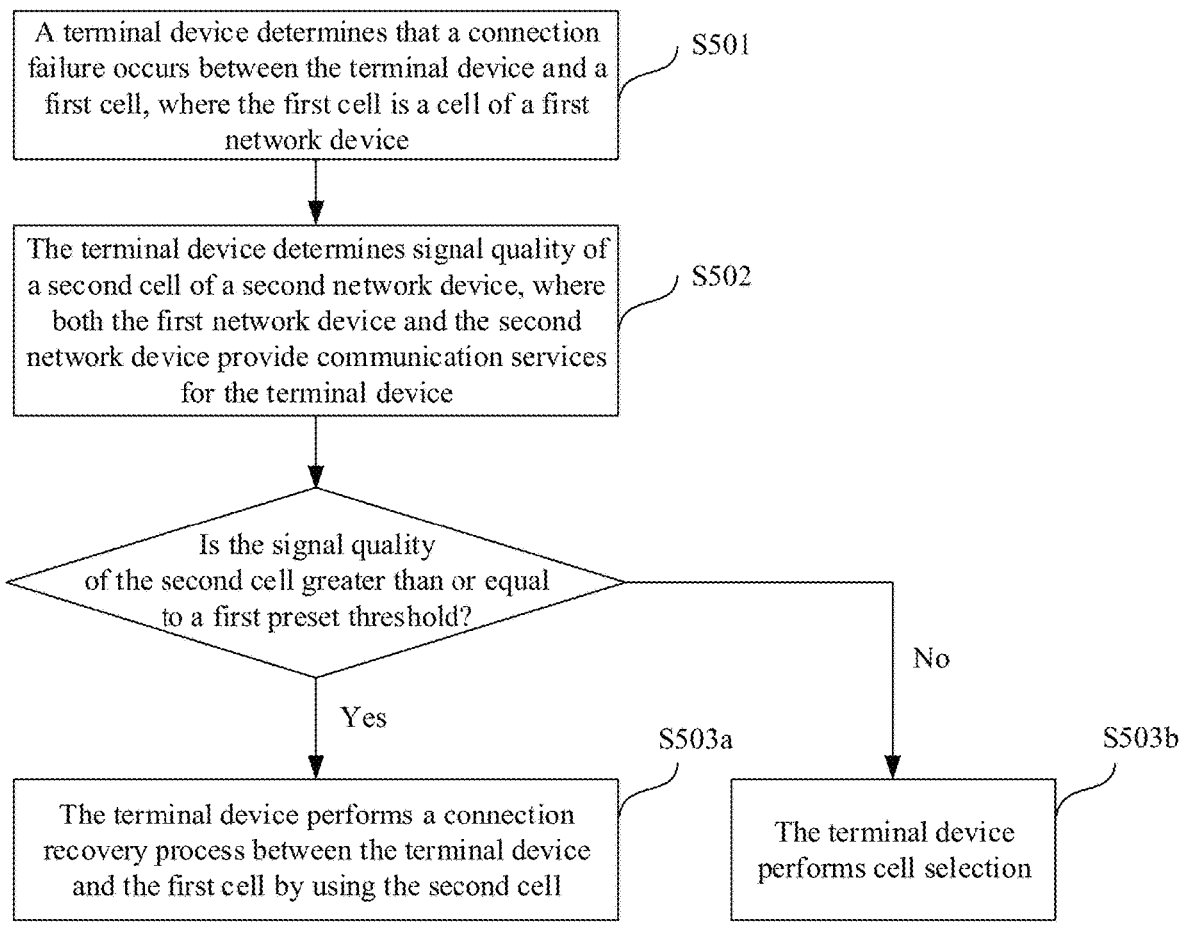
FIG. 5 is a schematic flowchart of a communication method according to an embodiment of this application.

Based on the foregoing wireless communication system 100, an embodiment of this application provides a communication method. Refer to FIG. 5. A communication link fault handling method includes but is not limited to the following steps.

S501. A terminal device determines that a connection failure occurs between the terminal device and a first cell, where the first cell is a cell of a first network device.

S502. The terminal device determines signal quality of a second cell of a second network device, where both the first network device and the second network device provide communication services for the terminal device.

If the signal quality of the second cell is greater than or equal to a first preset threshold, step S503a is performed. Otherwise, step S503b is performed.

S503a. The terminal device performs a connection recovery process between the terminal device and the first cell by using the second cell.

S503b. The terminal device performs cell selection.

In this embodiment of this application, the first cell may be a primary cell, a special cell, or all cells in a master cell group (MCG) that serves the terminal device, and a network device (for example, a base station) to which the master cell group belongs is the first network device. The first cell may include one or more cells. That a connection failure occurs between the terminal device and a first cell (that is, a connection failure occurs on the MCG) includes at least one of the following: a connection failure occurs between the terminal device and the primary cell in the MCG, a connection failure occurs between the terminal device and the special cell in the MCG, or a connection failure occurs between the terminal device and all the cells in the MCG.

When DC is configured for UE, the UE detects that the connection failure occurs on the MCG, the UE may measure the signal quality of the second cell. The second cell is at least one cell, a special cell, or a primary secondary cell in a secondary cell group (SCG) that serves the terminal device. A network device (for example, a base station) to which the secondary cell group belongs is the second network device. The second cell may include one or more cells. The signal quality may include at least one of received signal code power (RSCP), reference signal received power (RSRP), reference signal received quality (RSRQ), a signal-to-noise ratio (SNR), a signal to interference plus noise ratio (SINR), a reference signal strength indicator (RSSI), or other signal quality. The terminal device determines, based on the quality of the second cell, to perform an MCG fast recovery process (S503a) or the cell selection (S503b). For example, if the signal quality of the second cell is greater than or equal to a first preset threshold, the terminal device performs the connection recovery process between the terminal device and the first cell by using the second cell. If the signal quality of the second cell is less than the first preset threshold, the UE performs the cell selection.

The signal quality of the second cell that is determined by the terminal device includes: valid signal quality of the second cell that is measured by the terminal device, or signal quality of the second cell that is measured by the terminal device after the connection failure occurs in the first cell.

In S503a, that the terminal device performs a connection recovery process between the terminal device and the first cell by using the second cell may also be referred to as the MCG fast recovery process. That the terminal device performs a connection recovery process between the terminal device and the first cell by using the second cell includes: The terminal device sends connection failure information to the second network device to which the second cell belongs; and the second network device receives the connection failure information sent by the terminal device, and sends the connection failure information to the first network device to which the first cell belongs. It may be understood that the connection failure information may also be referred to as connection failure information of the MCG. After receiving a connection failure information, the first network device learns that the connection failure occurs in the first cell, and may send a new configuration to the terminal device. The new configuration is used to recover a connection between the terminal device and the first network device (or a connection between the terminal device and the first cell) or configure the terminal device to hand over to another cell.

Optionally, when the terminal device performs the cell selection, the terminal device retains configuration information of the SCG. The configuration information of the SCG includes at least one of a frequency of a cell in the SCG, a physical cell identifier (PCI), cell configuration information of the terminal device in the SCG, and the like.

Optionally, if a third cell selected by the terminal device after the cell selection (S503b) is still a cell (for example, a third cell) in an original SCG, the terminal device performs step S504a.

Step S504a: The terminal device performs the MCG fast recovery process by using the third cell.

The third cell may be the same as or different from the second cell. That the terminal device performs the connection recovery process between the terminal device and the first cell by using the third cell includes: The terminal device sends a connection failure message to the second network device to which the third cell belongs; and the second network device receives the connection failure message sent by the terminal device, and sends the connection failure message to the first network device to which the first cell belongs. After receiving the connection failure message, the first network device learns that the connection failure occurs in the first cell.

Optionally, if the terminal device selects a cell (for example, a fourth cell in a third network device) that does not belong to the SCG after the cell selection, the terminal device performs step S504b.

Step S504b: The terminal device initiates a reestablishment request by using a new cell.

For example, the terminal device sends the reestablishment request to the third network device to which the fourth cell belongs, to trigger a reestablishment process.

Figure 6:
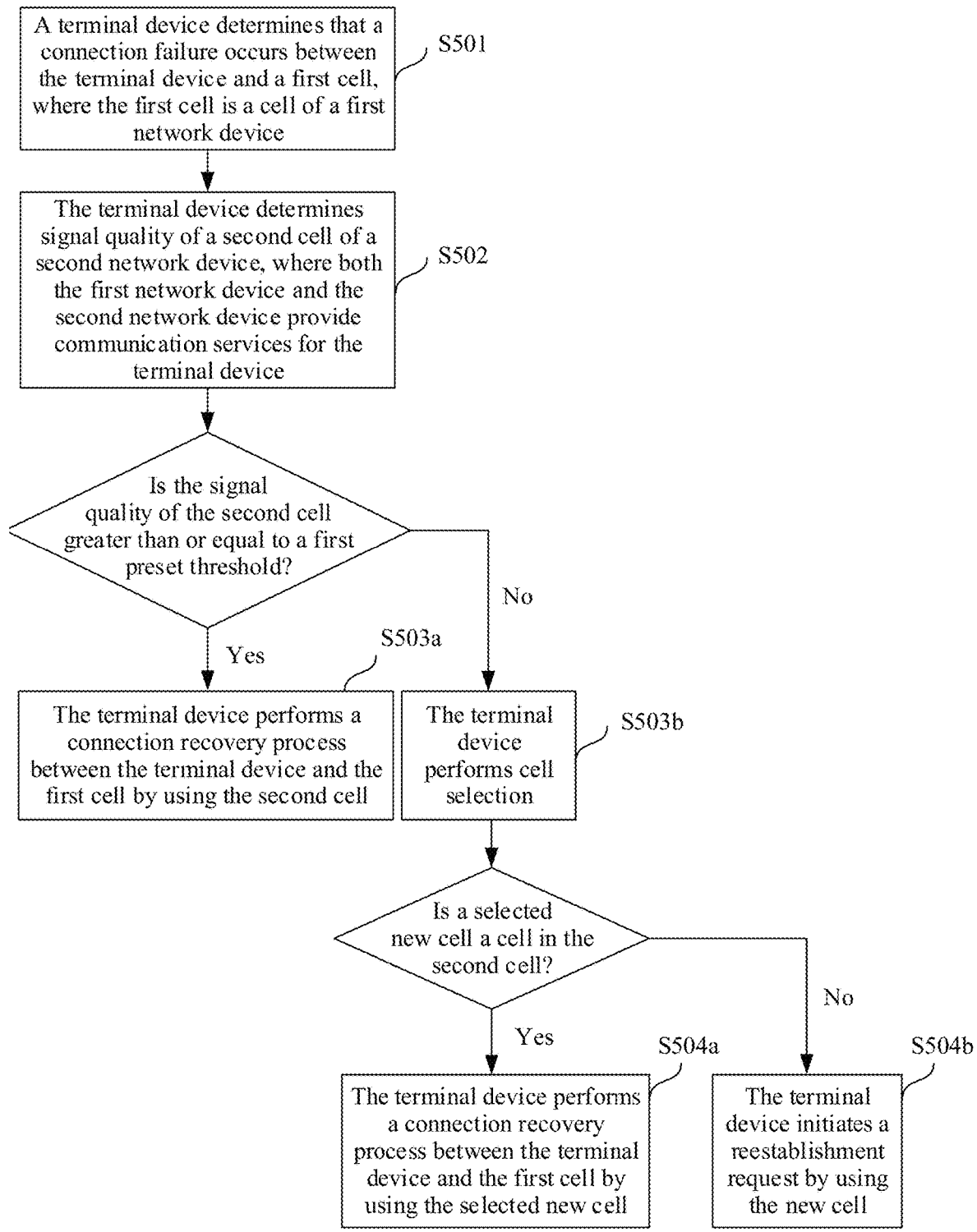
FIG. 6 is a schematic flowchart of another communication method according to an embodiment of this application.

For example, as shown in FIG. 6, after step S502, if the signal quality of the second cell is greater than or equal to the first preset threshold, the terminal device performs the connection recovery process between the terminal device and the first cell by using the second cell (S503a); or if the signal quality of the second cell is less than the first preset threshold, the terminal device performs the cell selection (S503b). If the new cell selected by the terminal device is a cell (for example, the third cell) in the SCG, the terminal device performs the connection recovery process between the terminal device and the first cell by using the selected new cell (S504a). If the new cell selected by the terminal device is a cell (for example, the fourth cell) of another network device, the terminal device initiates the reestablishment request by using the fourth cell (S504b).

Optionally, the first preset threshold may be predefined in a protocol, or may be received by the terminal device from the network device. Specifically, the terminal device may receive the first preset threshold from a current serving base station (that is, the first network device). The first preset threshold may be configured by the current serving base station, or may be received by the current serving base station from another base station.

According to this embodiment of this application, when the terminal device detects that the connection failure occurs on the MCG, the terminal device chooses, based on measurement quality of the SCG, to perform the MCG fast recovery process or a cell selection process, to select a most appropriate recovery mechanism.

The foregoing embodiment is described by using an example in which the first network device is a master eNodeB that currently serves the terminal device, and the second network device is a secondary eNodeB that currently serves the terminal device.

Optionally, this embodiment of this application may also be applied to a handover scenario. When an original serving network device configures the terminal device to perform handover, if the terminal device detects that a connection failure occurs after the terminal device is handed over to a target MCG, the terminal device may choose, with reference to camping time of the terminal device on the target MCG and signal quality of a target SCG, to perform a target MCG fast recovery process or a cell selection process. The target MCG is an MCG to which the terminal device needs to be handed over in a handover process, and the target SCG is an SCG to which the terminal device needs to be handed over in the handover process. This embodiment is described by using an example in which the first network device is a target master eNodeB to which the terminal device currently needs to be handed over, and the second network device is a target secondary eNodeB to which the terminal device currently needs to be handed over.

Figure 7:
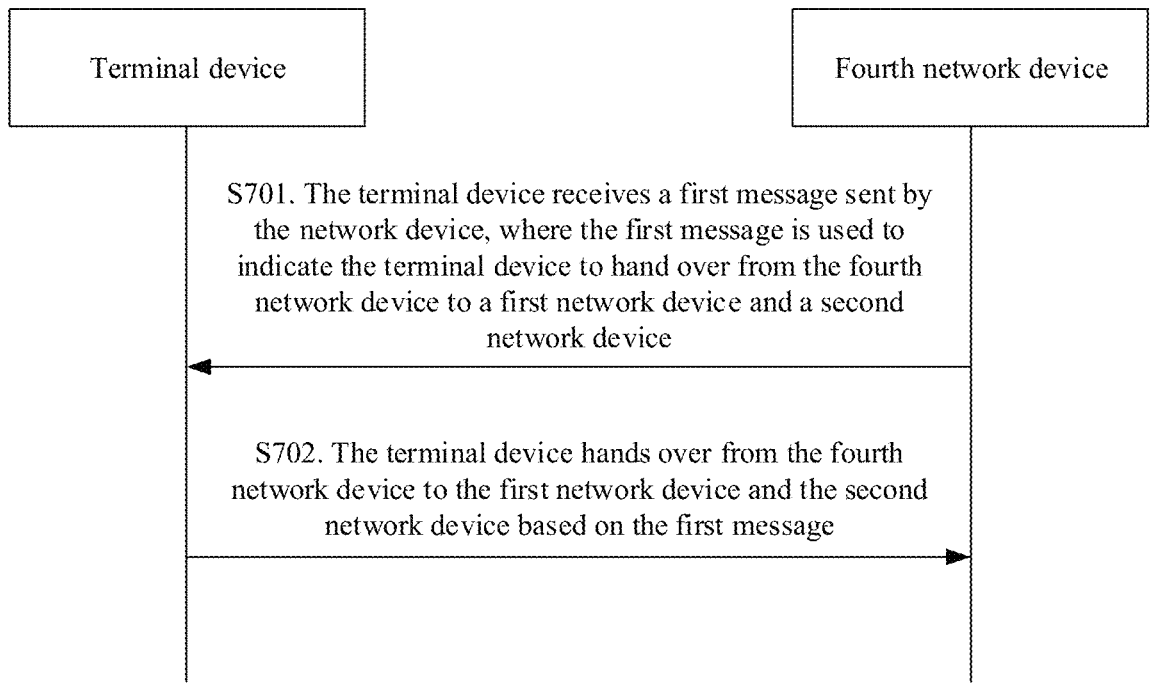
FIG. 7 is a schematic flowchart of another communication method according to an embodiment of this application.

Specifically, as shown in FIG. 7, before step S501, the method further includes:

S701. The terminal device receives a first message sent by a fourth network device, where the first message is used to indicate the terminal device to hand over from the fourth network device to the first network device and the second network device.

S702. The terminal device hands over from the fourth network device to the first network device and the second network device based on the first message.

That is, the terminal device is previously connected to the fourth network device, and then is handed over to the first network device and the second network device through a handover process. In other words, target DC may be configured for the terminal device after the handover. The handover of the terminal device to the first network device may also be referred to as handover of the terminal device to the first cell (MCG) of the first network device. The handover of the terminal device to the second network device may also be referred to as handover of the terminal device to the second cell (SCG) of the second network device. The first message may be one or a combination of RRC signaling, a media access control (MAC) control element (CE), and downlink control information (DCI). The first message includes configuration information of the target MCG and the target SCG, that is, includes configuration information of the first cell and the second cell.

In a case, after the terminal device completes the handover, that is, after the terminal device is handed over to the first network device and the second network device, the terminal device detects that the connection failure occurs between the terminal device and the target MCG (that is, the first cell). In this case, the terminal device may determine, based on duration between a moment at which the terminal device is successfully handed over to the first network device and a first moment and quality of the SCG, to perform the cell selection or the MCG fast recovery process. The first moment is a moment at which the connection failure occurs in the first cell. For example, if the duration between the moment at which the terminal device is successfully handed over to the first network device and the first moment is greater than or equal to a second preset threshold (that is, it takes relatively long time for the terminal device to detect that the connection failure occurs between the UE and the target MCG after the handover is completed), the terminal device performs step S501 and subsequent possible steps in the embodiment shown in FIG. 5.

Optionally, if the duration between the moment at which the terminal device is successfully handed over to the first network device and the first moment is less than the second preset threshold (that is, the terminal device soon detects that the connection failure occurs between the UE and the target MCG after completing the handover), the terminal device performs the cell selection. Optionally, if a cell selected by the terminal device is still a cell (for example, the third cell) in the target SCG after the cell selection, the terminal device performs the target MCG fast recovery process by using the third cell. For details, refer to the description in step S504a in the embodiment shown in FIG. 5. Optionally, if the terminal device selects a cell (for example, the fourth cell in the third network device) that does not belong to the SCG after the cell selection, the terminal device initiates a reestablishment request by using the new cell. For details, refer to the description in step S504b in the embodiment shown in FIG. 5.

Optionally, if the duration between the moment at which the terminal device is successfully handed over to the first network device and the first moment is less than the second preset threshold, and signal quality of the second cell is less than a first preset threshold, the terminal device performs the cell selection.

For example, after completing handover to the target MCG, the terminal device starts a timer. If running time of the timer is less than the second preset threshold T, the terminal device considers that the terminal device "soon" detects that the connection failure occurs between the terminal device and the target MCG.

Optionally, the first preset threshold and the second preset threshold may be predefined in a protocol, or may be received by the terminal device from a network device. Specifically, the terminal device may receive the first preset threshold and the second preset threshold from a current serving base station. The first preset threshold and the second preset threshold may be configured by the current serving base station, or may be received by the current serving base station from another base station.

In another case, when the UE detects that the connection failure occurs between the UE and the target MCG in the handover process (that is, a handover failure (HO failure, HOF) occurs in the handover process, and the terminal device is not successfully handed over to the first network device and the second network device), the UE performs the cell selection. Assuming that the UE selects a target cell, the UE performs a reestablishment procedure in the target cell. It may be understood that if the target cell belongs to a cell (that is, the second cell) in the target SCG, the UE may perform the MCG fast recovery process. Optionally, if the terminal device is not successfully handed over to the first network device and the signal quality of the second cell is less than the first preset threshold, the terminal device performs the cell selection.

This embodiment of this application may also be applied to a handover scenario. When the terminal device detects that the connection failure occurs on the target MCG to which the terminal device is handed over, the terminal device may choose, with reference to camping time of the terminal device on the target MCG and signal quality of the target SCG, to perform the target MCG fast recovery process or the cell selection process.

According to this embodiment of this application, for the handover scenario, when the terminal device detects that the connection failure occurs on the target MCG to which the terminal device is handed over, the terminal device may choose, with reference to the camping time of the terminal device on the target MCG and the signal quality of the target SCG, to perform the target MCG fast recovery process or the cell selection process, to select a most appropriate recovery mechanism. A problem of data transmission interruption caused by the connection failure on the target MCG in a too early HO or HO to wrong cell scenario can be alleviated, so that reestablishment in the handover scenario can be recovered as soon as possible.

It should be noted that steps S501, S502, S503a, and S503b are used as an embodiment for description. In another optional implementation, steps S501, S502, and S503a may be independently used as an embodiment, and steps S501, S502, and S503b may also be independently used as an embodiment. For a specific implementation process, reference may also be made to related descriptions in the foregoing embodiments. Details are not described herein again.

A person of ordinary skill in the art should easily be aware that, in combination with the examples described in the embodiments disclosed in this specification, the terminal device and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

It may be understood that, in the foregoing method, the method implemented by the terminal device may alternatively be implemented by a component (for example, a chip, a chip system, or a circuit) that may be disposed in the terminal device.

In the embodiments of this application, the terminal device and the like may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in the embodiments of this application, division into the modules is an example, and is merely a logical function division. During actual implementation, another division manner may be used.

Figure 8:
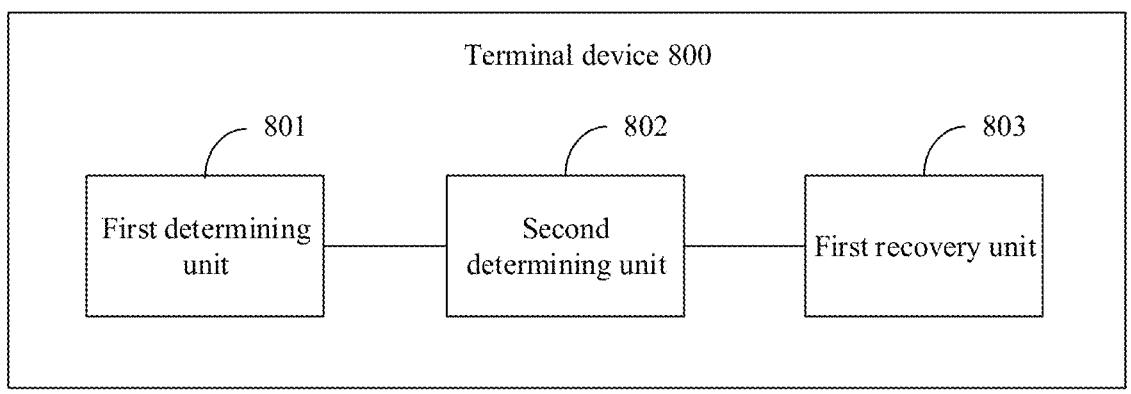
FIG. 8 is a schematic diagram of a logical structure of a terminal device according to an embodiment of this application.

When each function module is obtained through division based on each function, FIG. 8 is a possible schematic diagram of a logical structure of the terminal device in the foregoing embodiments. A terminal device 800 includes a first determining unit 801, a second determining unit 802, and a first recovery unit 803. The terminal device 800 may be the terminal device or a component that may be disposed in the terminal device. Optionally, the terminal device 800 may further include a communication unit. For example, the communication unit is configured to support the terminal device 800 in performing steps corresponding to receiving or sending information by the terminal device in the method embodiments shown in FIG. 5 to FIG. 7. The first determining unit 801, the second determining unit 802, and the first recovery unit 803 are configured to support the terminal device 800 in performing related processing steps corresponding to the terminal device in the method embodiments shown in FIG. 5 to FIG. 7, for example, implementing a function other than a transceiver unit function. Optionally, the terminal device 800 may further include a storage unit, configured to store code (a program) or data. For example, the first determining unit 801 is configured to determine that a connection failure occurs between the terminal device and a first cell, where the first cell is a cell of a first network device;

the second determining unit 802 is configured to determine signal quality of a second cell of a second network device, where both the first network device and the second network device provide communication services for the terminal device; and the first recovery unit 803 is configured to: if the signal quality of the second cell is greater than or equal to a first preset threshold, perform a connection recovery process between the terminal device and the first cell by using the second cell.

In hardware implementation, the first determining unit 801, the second determining unit 802 and the first recovery unit 803 may be a processor, a processing circuit, or the like. The communication unit may be a transceiver, a transceiver circuit, an interface circuit, or the like. The storage unit may be a memory. The first determining unit 801, the second determining unit 802, the first recovery unit 803, the communication unit, and the storage unit may be integrated or separated.

For another function and a related implementation process of the terminal device 800 provided in this embodiment of this application, refer to related descriptions in the method embodiments shown in FIG. 5 to FIG. 7. Details are not described herein again.

Figure 9:
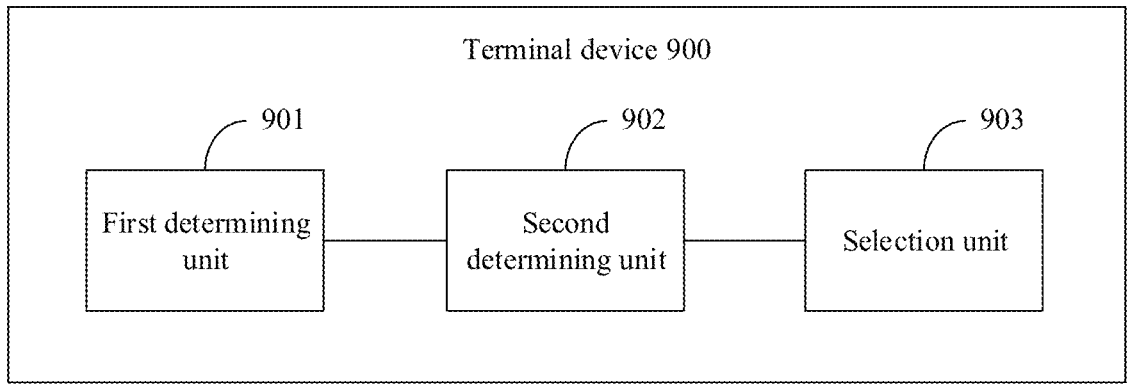
FIG. 9 is a schematic diagram of a logical structure of another terminal device according to an embodiment of this application.

FIG. 9 is a possible schematic diagram of a logical structure of the terminal device in the foregoing embodiments. A terminal device 900 includes a first determining unit 901, a second determining unit 902, and a selection unit 903. The terminal device 900 may be the terminal device or a component that may be disposed in the terminal device. Optionally, the terminal device 900 may further include a communication unit. For example, the communication unit is configured to support the terminal device 900 in performing steps corresponding to receiving or sending information by the terminal device in the method embodiments shown in FIG. 5 to FIG. 7. The first determining unit 901, the second determining unit 902, and the selection unit 903 are configured to support the terminal device 900 in performing related processing steps corresponding to the terminal device in the method embodiments shown in FIG. 5 to FIG. 7, for example, implementing a function other than a transceiver unit function. Optionally, the terminal device 900 may further include a storage unit, configured to store code (a program) or data. For example, the first determining unit 901 is configured to determine that a connection failure occurs between the terminal device and a first cell, where the first cell is a cell of a first network device;

the second determining unit 902 is configured to determine signal quality of a second cell of a second network device, where both the first network device and the second network device provide communication services for the terminal device; and the selection unit 903 is configured to perform cell selection if the signal quality of the second cell is less than a first preset threshold.

In hardware implementation, the first determining unit 901, the second determining unit 902, and the selection unit 903 may be a processor, a processing circuit, or the like. The communication unit may be a transceiver, a transceiver circuit, an interface circuit, or the like. The storage unit may be a memory. The first determining unit 901, the second determining unit 902, the selection unit 903, the communication unit, and the storage unit may be integrated or separated.

For another function and a related implementation process of the terminal device 900 provided in this embodiment of this application, refer to related descriptions in the method embodiments shown in FIG. 5 to FIG. 7. Details are not described herein again.

Figure 10:
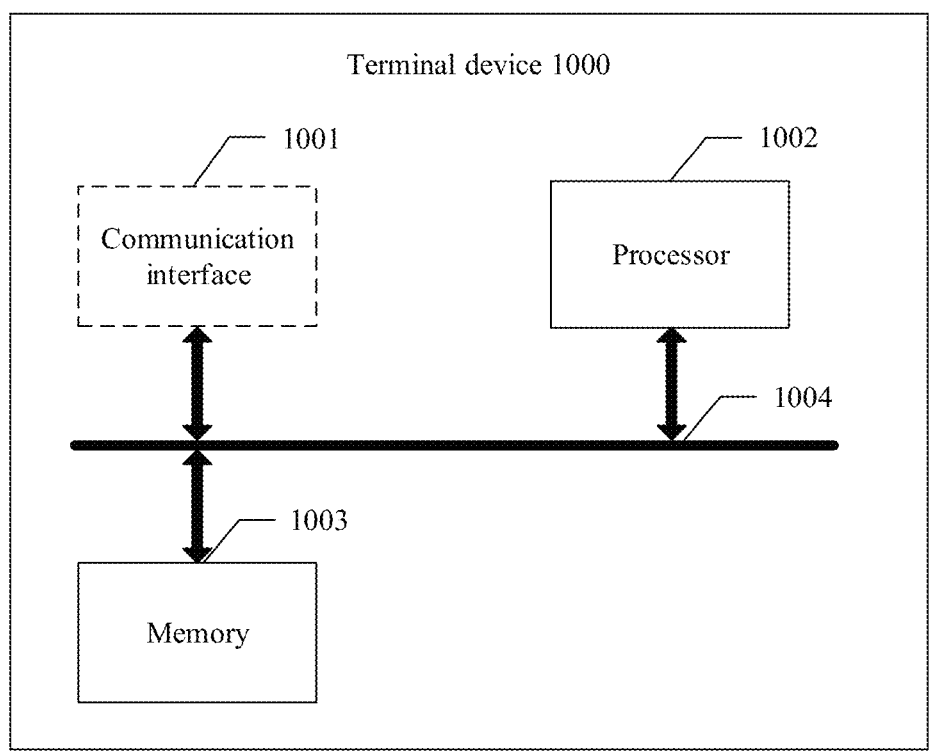
FIG. 10 is a schematic diagram of a hardware structure of a terminal device according to an embodiment of this application.

FIG. 10 is a possible schematic diagram of a hardware structure of a terminal device 1000 according to an embodiment of this application. The terminal device 1000 is configured to implement a function of the terminal device in the foregoing methods. The terminal device may alternatively be an apparatus in the terminal device. The apparatus may be a chip system. In this embodiment of this application, the chip system may include a chip, or may include a chip and another discrete component. The terminal device 1000 includes at least one processor 1002, configured to implement the function of the terminal device in the methods provided in the embodiments of this application. For example, the processor 1002 may determine that a connection failure occurs between the terminal device and a first cell. The processor 1002 may further determine signal quality of a second cell of a second network device. The processor 1002 may further perform a connection recovery process between the terminal and the first cell by using the second cell when the signal quality of the second cell is greater than or equal to a first preset threshold. For details, refer to detailed descriptions in the method examples in FIG. 5 to FIG. 7. Details are not described herein again.

The terminal device 1000 may further include at least one memory 1003, configured to store program instructions and/or data. The memory 1003 is coupled with the processor 1002. Coupling in this embodiment of this application is indirect coupling or a communication connection between apparatuses, units, or modules, may be in an electrical form, a mechanical form, or another form, and is used for information exchange between the apparatuses, the units, or the modules. The processor 1002 may operate in cooperation with the memory 1003. The processor 1002 may execute the program instructions stored in the memory 1003. At least one of the at least one memory may be included in the processor.

The terminal device 1000 may further include a communication interface 1001, configured to communicate with another device through a transmission medium, so that the terminal device 1000 can communicate with the another device. For example, the another device may be a network device. The processor 1002 receives and sends data through the communication interface 1001, and is configured to implement the methods performed by the terminal device in the embodiments corresponding to FIG. 5 to FIG. 7. The communication interface 1001 may be a transceiver, an interface, a bus, a circuit, or an apparatus that can implement a transceiver function.

In this embodiment of this application, a specific connection medium between the communication interface 1001, the processor 1002, and the memory 1003 is not limited. In this embodiment of this application, the memory 1003, the processor 1002, and the communication interface 1001 are connected by using a bus 1004 in FIG. 10. In FIG. 10, the bus is represented by a thick line. A connection manner between other components is merely described by using an example, and is not limited thereto. The bus may be classified into an address bus, a data bus, a control bus, or the like. For ease of representation, only one thick line is used to represent the bus in FIG. 10, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

In this embodiment of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

It may be understood that the terminal device 1000 may be the terminal device 102 in the wireless communication system 100 shown in FIG. 1, and may be implemented as an eMTC device, a mobile device, a mobile station, a mobile unit, a radio unit, a remote unit, a user agent, a mobile client, or the like.

It should be noted that the terminal device 1000 shown in FIG. 10 is merely an implementation of this embodiment of this application, and during actual application, the terminal device 1000 may further include more or fewer components. This is not limited herein. For a specific implementation of the terminal device 1000, refer to related descriptions in the foregoing method embodiments. Details are not described herein again.

Figure 11:
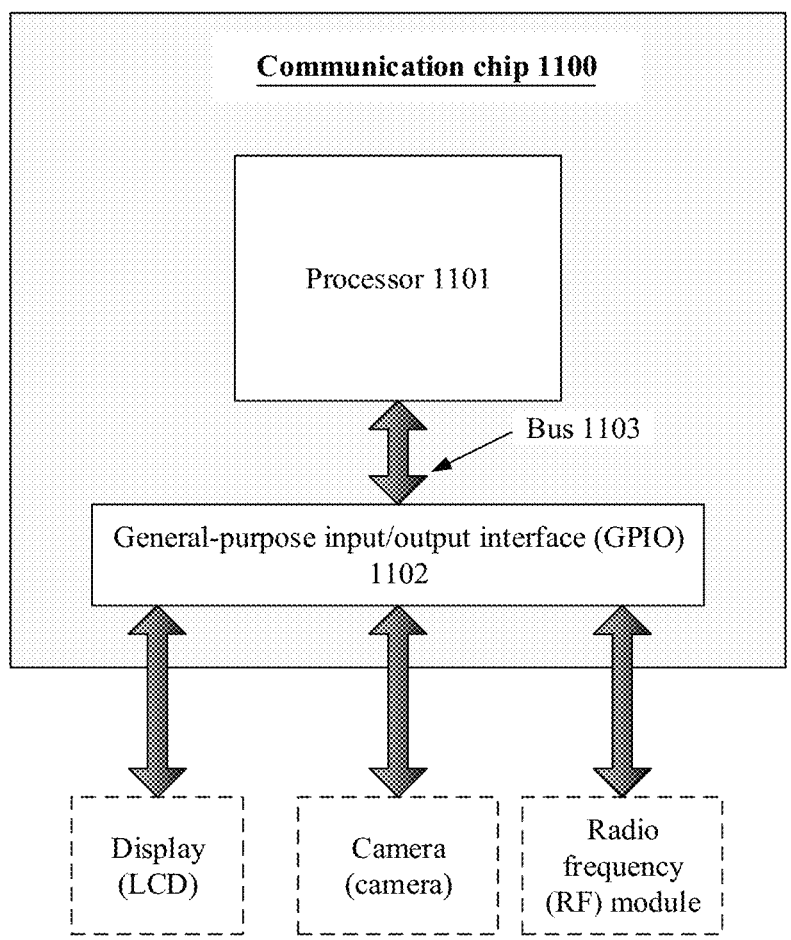
FIG. 11 is a schematic diagram of a structure of a communication chip according to an embodiment of this application.

FIG. 11 is a schematic diagram of a structure of a communication chip 1100 according to this application. As shown in FIG. 11, the communication chip 1100 may include a processor 1101, and one or more interfaces 1102 coupled with the processor 1101. An example is as follows:

The processor 1101 may be configured to read and execute computer-readable instructions. During specific implementation, the processor 1101 may mainly include a controller, an arithmetic unit, and a register. For example, the controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor 1101 may be an application-specific integrated circuit (ASIC) architecture, a microprocessor without interlocked pipeline stages architecture (MIPS), an advanced reduced instruction set computing machine (advanced RISC machines, ARM) architecture, an NP architecture, or the like. The processor 1101 may be a single-core or multi-core processor.

For example, the interface 1102 may be configured to input to-be-processed data to the processor 1101, and may output a processing result of the processor 1101. During specific implementation, the interface 1102 may be a general-purpose input/output (GPIO) interface, and may be connected to a plurality of peripheral devices (for example, a display (LCD), a camera, and a radio frequency (RF) module). The interface 1102 is connected to the processor 1101 by using the bus 1103.

In a possible implementation, the processor 1101 may be configured to invoke an instruction from the memory and execute the instruction, to implement an implementation program or data, on a terminal device side, for the method provided in one or more embodiments of this application, so that the chip can implement the methods shown in FIG. 5 to FIG. 7. The memory may be integrated into the processor 1101, or may be coupled with the communication chip 1100 through the interface 1102. In other words, the memory may be a part of the communication chip 1100, or may be independent of the communication chip 1100. The interface 1102 may be configured to output an execution result of the processor 1101. In this application, the interface 1102 may be specifically configured to output a signal generated by the processor 1101. For the method provided in the one or more embodiments of this application, refer to the foregoing embodiments. Details are not described herein again.

It should be noted that a function corresponding to each of the processor 1101 and the interface 1102 may be implemented by using a hardware design, or may be implemented by using a software design, or may be implemented by using a combination of software and hardware. This is not limited herein.

In another embodiment of this application, a computer storage medium is further provided. The computer storage medium stores computer-executable instructions. When a device (which may be a single chip microcomputer, a chip, or the like) or a processor may invoke the computer-executable instructions stored in the readable storage medium, so that the device or the processor performs the steps of the terminal device in the methods provided in FIG. 5 to FIG. 7. The foregoing computer storage medium may include: any medium that can store program code, such as a USB flash drive, a removable hard disk, a read-only memory, a random access memory, a magnetic disk, or an optical disc.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device implements the steps of the terminal device in the methods provided in FIG. 5 to FIG. 7.

In another embodiment of this application, a communication system is further provided. The communication system includes a plurality of devices, and the plurality of devices include a network device and a terminal device. For example, the terminal device may be the terminal device 800 shown in FIG. 8, the terminal device 900 provided in FIG. 9, or the terminal device 1000 provided in FIG. 10, and is configured to perform steps corresponding to the terminal device in the methods provided in FIG. 5 to FIG. 7.

All or some of the methods provided in the embodiments of this application may be implemented by using software, hardware, firmware, or any combination thereof. When software is used for implementation, all or some of the methods may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

In the embodiments of this application, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A communication method, comprising:
   determining, by a terminal device, that a connection failure occurs between the terminal device and a first cell, wherein the first cell is a cell of a first network device;
   in response to determining that a time duration that lapses after the terminal device is successfully handed over to the first network device and before the connection failure occurs is greater than or equal to a predetermined time duration, determining, by the terminal device, signal quality of a second cell of a second network device, wherein both the first network device and the second network device provide communication services for the terminal device; and
   in response to determining that the signal quality of the second cell is greater than or equal to a first preset threshold, performing, by the terminal device, a connection recovery process between the terminal device and the first cell by using the second cell.

2. The communication method according to claim 1, further comprising:
   performing, by the terminal device, cell selection in response to determining that the signal quality of the second cell is less than the first preset threshold.

3. The communication method according to claim 2, wherein in response to a determination that a cell selected by the terminal device after the cell selection is a third cell of the second network device, the communication method further comprises:

performing, by the terminal device, the connection recovery process between the terminal device and the first cell by using the third cell.

4. The communication method according to claim 2, wherein, in response to a determination that a cell selected by the terminal device after the cell selection is a fourth cell of a third network device, the communication method further comprises:
   sending, by the terminal device, a reestablishment request to the third network device to which the fourth cell belongs.

5. The communication method according to claim 2, wherein when the terminal device performs the cell selection, the terminal device retains configuration information of the second cell, and wherein the configuration information of the second cell comprises at least one of a frequency of the second cell, a physical cell identifier (PCI), cell configuration information of the terminal device in the second cell.

6. The communication method according to claim 1, wherein:
   the determining, by a terminal device, that a connection failure occurs between the terminal device and a first cell comprises:
      determining, by the terminal device, that a moment at which the connection failure occurs between the terminal device and the first cell is a first moment;
   the predetermined time duration comprises a second preset threshold; and
   the in response to determining that a time duration that lapses after the terminal device is successfully handed over to the first network device and before the connection failure occurs is greater than or equal to a predetermined time duration, determining, by the terminal device, signal quality of a second cell of a second network device comprises:
      in response to determining that a duration between a moment at which the terminal device is successfully handed over to the first network device and the first moment is greater than or equal to the second preset threshold, determining, by the terminal device, the signal quality of the second cell of the second network device.

7. The communication method according to claim 1, wherein the performing, by the terminal device, a connection recovery process between the terminal device and the first cell by using the second cell comprises:
   sending, by the terminal device, connection failure information to the second network device, wherein the connection failure information is forwarded by the second network device to the first network device; and
   receiving, by the terminal device, new configuration from the first network device, wherein the new configuration is used to recover a connection between the terminal device and the first network device.

8. A communication method, comprising:
   determining, by a terminal device, that a connection failure occurs between the terminal device and a first cell, wherein the first cell is a cell of a first network device;
   in response to determining that a time duration that lapses after the terminal device is successfully handed over to the first network device and before the connection failure occurs is less than a predetermined time duration, determining, by the terminal device, signal quality of a second cell of a second network device, wherein both the first network device and the second network device provide communication services for the terminal device; and performing, by the terminal device, cell selection in response to determining that the signal quality of the second cell is less than a first preset threshold.

9. The communication method according to claim 8, wherein, in response to a determination that a cell selected by the terminal device after the cell selection is a third cell of the second network device, the communication method further comprises:

performing, by the terminal device, a connection recovery process between the terminal device and the first cell by using the third cell.

10. The communication method according to claim 8, wherein, in response to a determination that a cell selected by the terminal device after the cell selection is a fourth cell of a third network device, the communication method further comprises:

sending, by the terminal device, a reestablishment request to the third network device to which the fourth cell belongs.

11. The communication method according to claim 8, wherein:

the determining, by a terminal device, that a connection failure occurs between the terminal device and a first cell comprises:
 determining, by the terminal device, that a moment at which the connection failure occurs between the terminal device and the first cell is a first moment; and the predetermined time duration comprises a second preset threshold; and the in response to determining that a time duration that lapses after the terminal device is successfully handed over to the first network device and before the connection failure occurs is less than a predetermined time duration, determining, by the terminal device, signal quality of a second cell of a second network device comprises:
 in response to determining that a duration between a moment at which the terminal device is successfully handed over to the first network device and the first moment is less than the second preset threshold, determining, by the terminal device, the signal quality of the second cell of the second network device.

12. The communication method according to claim 8, wherein:

the determining, by a terminal device, that a connection failure occurs between the terminal device and a first cell comprises:
 determining, by the terminal device, that a moment at which the connection failure occurs between the terminal device and the first cell is a first moment; and the communication method comprises:
 in response to determining that the terminal device is not successfully handed over to the first network device at the first moment, determining, by the terminal device, the signal quality of the second cell of the second network device.

13. The communication method according to claim 8, wherein when the terminal device performs the cell selection, the terminal device retains configuration information of the second cell, and wherein the configuration information of the second cell comprises at least one of a frequency of the second cell, a physical cell identifier (PCI), cell configuration information of the terminal device in the second cell.

14. A terminal device, comprising:

at least one processor; and one or more memories coupled to the at least one processor and storing instructions for execution by the at least one processor to:
 determine that a connection failure occurs between the terminal device and a first cell, wherein the first cell is a cell of a first network device;
 in response to determining that a time duration that lapses after the terminal device is successfully handed over to the first network device and before the connection failure occurs is greater than or equal to a predetermined time duration, determine signal quality of a second cell of a second network device, wherein both the first network device and the second network device provide communication services for the terminal device; and
 in response to determining that the signal quality of the second cell is greater than or equal to a first preset threshold, perform a connection recovery process between the terminal device and the first cell by using the second cell.

15. The terminal device according to claim 14, wherein the one or more memories store the instructions for execution by the at least one processor to:

perform cell selection in response to determining that the signal quality of the second cell is less than the first preset threshold.

16. The terminal device according to claim 15, wherein in response to a determination that a cell selected by the terminal device after the cell selection is a third cell of the second network device, the one or more memories store the instructions for execution by the at least one processor to:

perform the connection recovery process between the terminal device and the first cell by using the third cell.

17. The terminal device according to claim 15, wherein in response to a determination that a cell selected by the terminal device after the cell selection is a fourth cell of a third network device, the one or more memories store the instructions for execution by the at least one processor to:

send a reestablishment request to the third network device to which the fourth cell belongs.

18. The terminal device according to claim 15, wherein when the terminal device performs the cell selection, the terminal device retains configuration information of the second cell, and wherein the configuration information of the second cell comprises at least one of a frequency of the second cell, a physical cell identifier (PCI), cell configuration information of the terminal device in the second cell.

19. The terminal device according to claim 14, wherein the predetermined time duration comprises a second preset threshold, and wherein the one or more memories store the instructions for execution by the at least one processor to:

determine that a moment at which the connection failure occurs between the terminal device and the first cell is a first moment; and in response to determining that a duration between a moment at which the terminal device is successfully handed over to the first network device and the first moment is greater than or equal to the second preset threshold, determine the signal quality of the second cell of the second network device.

20. The terminal device according to claim 14, wherein the perform a connection recovery process between the terminal device and the first cell by using the second cell comprises:
    send connection failure information to the second network device, wherein the connection failure information is forwarded by the second network device to the first network device; and
    receive new configuration from the first network device, wherein the new configuration is used to recover a connection between the terminal device and the first network device.

\* \* \* \* \*

UNITED STATES PATENT AND TRADEMARK OFFICE
CERTIFICATE OF CORRECTION

PATENT NO. : 12,262,274 B2
APPLICATION NO. : 17/581291
DATED : March 25, 2025
INVENTOR(S) : Tingting Geng, Le Yan and Hongping Zhang It is certified that error appears in the above-identified patent and that said Letters Patent is hereby corrected as shown below:

In the Claims

In Column 24, In Line 31, In Claim 6, before "in" delete "the".

In Column 25, In Line 35, In Claim 11, before "in" delete "the".

Signed and Sealed this
Twenty-ninth Day of July, 2025

Coke Morgan Stewart
*Acting Director of the United States Patent and Trademark Office*